July 18, 1961     H. B. HUNTRESS     2,992,706
FRICTION COUPLE

Filed Aug. 7, 1959     7 Sheets-Sheet 1

INVENTOR

HOWARD B. HUNTRESS

BY Wallace and Cannon
ATTYS.

July 18, 1961  H. B. HUNTRESS  2,992,706
FRICTION COUPLE

Filed Aug. 7, 1959  7 Sheets-Sheet 2

INVENTOR.
HOWARD B. HUNTRESS
BY
*Wallace and Cannon*
ATT'YS.

July 18, 1961  H. B. HUNTRESS  2,992,706
FRICTION COUPLE

Filed Aug. 7, 1959  7 Sheets-Sheet 3

INVENTOR.
HOWARD B. HUNTRESS
BY
Wallace and Cannon
ATT'YS.

July 18, 1961 H. B. HUNTRESS 2,992,706
FRICTION COUPLE
Filed Aug. 7, 1959 7 Sheets-Sheet 4

INVENTOR.
HOWARD B. HUNTRESS
BY
Wallace and Cannon
ATTYS.

July 18, 1961 H. B. HUNTRESS 2,992,706
FRICTION COUPLE
Filed Aug. 7, 1959 7 Sheets-Sheet 5

INVENTOR.
HOWARD B. HUNTRESS
BY
Wallace and Cannon
ATT'YS.

INVENTOR.
HOWARD B. HUNTRESS

INVENTOR.
HOWARD B. HUNTRESS

United States Patent Office 2,992,706
Patented July 18, 1961

2,992,706
FRICTION COUPLE
Howard B. Huntress, Suffern, N.Y., assignor to American Brake Shoe Company, New York, N.Y., a corporation of Delaware
Filed Aug. 7, 1959, Ser. No. 832,193
19 Claims. (Cl. 188—74)

This invention relates to an internal expanding brake or like friction couple where energy is to be converted or motion transmitted.

Friction couples, which are arrangements of structural parts incorporating a rotatable member that is to have its motion and energy decreased, as in a brake, or motion transmitted to another rotatable member, as in a clutch, have wide application in the mechanical arts. This invention relates to a manner of connecting and actuating certain structural elements in a friction couple to obtain a large amount of torque transmission through the friction couple from a small actuating force. This invention has particular application to internal expanding and external contracting brake friction couples and will be specifically described hereinafter as utilized in such friction couples.

This application is a continuation-in-part of application Serial No. 766,257, filed October 8, 1958, now abandoned, which in turn is a continuation-in-part of application Serial No. 509,147, filed May 18, 1955, and now abandoned.

Internal expanding brakes as presently constructed are for the most part usually of the self-energizing or servo-type. One well-known brake of this kind utilizes two arcuate internal shoes adapted to be actuated simultaneously against the drum by a pair of hydraulically operated pistons acting in a common cylinder. The shoes in this brake are connected by a link at one end such that the end of one shoe is connected directly to the immediately adjacent end of the next shoe. A primary object of the present invention is to so link the shoes in an internal expanding brake or like friction couple of the servo-type that the braking power will be increased over what has heretofore been obtained with brakes of this type.

A further object of the present invention is to greatly increase the efficiency of servo-type internal expanding brakes by having resort to an odd number of brake shoes that are linked together alternately rather than contiguously as has heretofore been the practice.

A further object of the present invention is to increase the torque or braking force by applying to the shoes of an internal expanding friction couple both an initial force and a regenerative force.

Other and further objects of the present invention will be apparent from the following description and claims and are illustrated in the accompanying drawings which, by way of illustration show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 1:
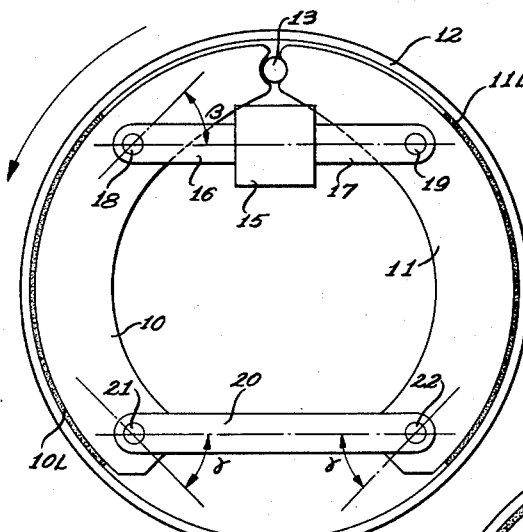
FIG. 1 is an elevation, partly diagrammatic, of a known kind of brake.

A servo-type internal expanding brake of a well-known kind is illustrated in FIG. 1 as comprising a pair of segmental shoes 10 and 11 shown expanded outwardly against the brake drum 12 so that the linings 10L and 11L thereon are effective in a braking action to retard movement of the drum rotating in the direction indicated by the arrow. The shoes 10 and 11 react at one end against a common anchor lug as 13. A hydraulic cylinder 15 is arranged to actuate a pair of piston rods 16 and 17 connected respectively to pins as 18 and 19 on the shoes 10 and 11. For purposes of simplicity, the return means for biasing the shoes 10 and 11 in normal disengaged position is not shown.

At one end, the shoes 10 and 11 are connected one to the other by a rigid link or strut 20 journalled on pins as 21 and 22 provided at the opposing ends of the shoes 10 and 11.

In actuating the brake shown in FIG. 1, fluid under pressure in the cylinder 15 drives the piston rods outwardly against the shoes at a relatively sharp angle beta included between the piston axis and the tangent of the arc of the shoe at the point of applied piston pressure, as illustrated conventionally in FIG. 1.

Assuming the drum 12 to be rotating in the direction shown by the arrow, the braking force thus transmitted to shoe 10 increases along the arc of the lining from the portion actuated by the piston rod 16 toward the end connected by the link 20 to the adjacent end of the other shoe 11, and this increased force will be applied to the link 20 at an angle gamma between the axis of the link 20 and the tangent to the shoe 10 at the point where the link 20 is connected thereto, as illustrated conventionally in FIG. 1.

The braking force thus transmitted from shoe 10 to shoe 11 continues to wrap up along shoe 11 until the circuit of force is completed at pin 19. The foregoing in an opposite sense is also true, and the effect in either direction is analogous to that of a single wrap about a capstan tending to stop rotation of the capstan.

It can be demonstrated for servo-brakes of the foregoing kind that by having resort to an odd number of shoes and linking these shoes alternately the power of a servo-brake can be increased by a significant factor.

Figure 2:
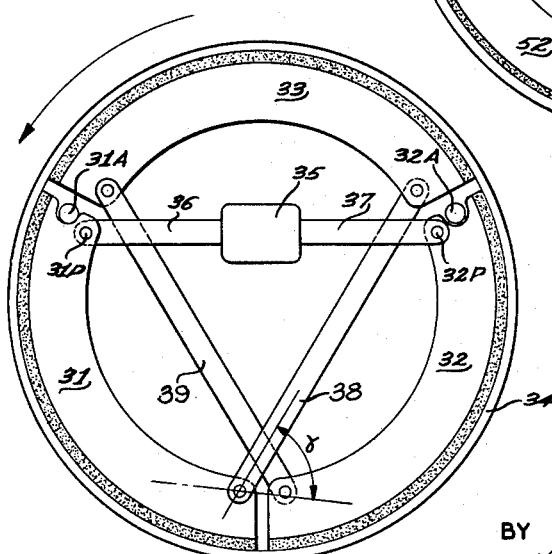
FIG. 2 is an elevation, partly diagrammatic, of one embodiment of the present invention and incorporates three shoes connected by non-articulated linkages.

Thus, the brake of the present invention includes an odd number of shoes, and in FIG. 2 I show a brake of the present invention as including three shoes, 31, 32, and 33, having linings engaging the inner surface of the brake drum. To actuate the brake, a cylinder 35 having a pair of piston rods 36 and 37 is afforded, piston rod 36 at the driving end being connected to a pin 31P at the end of shoe 31 adjacent its anchor pin 31A and piston rod 37 being connected to a pin 32P at the end of the shoe 32 adjacent its anchor 32A.

The end of shoe 31 opposite the anchor pin 31A is connected by a strut or link 38 to the end of shoe 33 disposed adjacent the anchor pin 32A for shoe 32, shoe 32 being skipped by such link. Likewise, a second link 39 is connected between the end of shoe 33 adjacent the anchor pin 31A for shoe 31 and the end of shoe 32 opposite its anchor pin.

The piston rods 36 and 37 and the links 38 and 39 are preferably connected to the brake shoes in pin joint connections as illustrated and such connections will be shown throughout.

The end of the shoe 31 which is disposed adjacent the anchor 31A is conventionally designated as the leading end of the shoe with the counterclockwise direction of rotation of the outer drum as indicated by the arrow in FIG. 2. The opposite end of the shoe 31, that end which is connected to the link 38, is designated the trailing end. With a clockwise direction of rotation of the drum, that is, rotation in a direction opposite that indicated by the arrow, the designation of the two ends of the shoe 31 would be reversed and the end adjacent the anchor 31A would be the trailing end. Thus, the leading end of the shoe is that end of the shoe which leads into the rotating drum and this convention will be followed throughout this application.

From the foregoing, it will be seen that the three-shoe brake illustrated in FIG. 2 is constructed so that the shoes are not linked one to the immediate adjacent shoe. Rather, the shoes are linked alternately so that the trailing end of one shoe is linked to the leading end of the third shoe, the second shoe being by-passed, and the trailing end of the third shoe is linked to the leading end of the second shoe, the first shoe being by-passed. Likewise, the two piston rods act against the leading end of the first shoe and the trailing end of the second shoe, the third shoe being by-passed.

In operation, an expansion force generated within the cylinder 35 displaces piston rods 36 and 37 outwardly of the cylinder 35. The rods 36 and 37, acting on pin joints 31P and 32P, move the shoes into engagement with the inner circumferential surface of the brake drum 34 and, with the counterclockwise direction of rotation indicated by the arrow, the end of the brake shoe 32 adjacent anchor 32A is moved into engagement with the anchor. A brake actuating force developed within the cylinder 35 and transmitted through the rod 36 to the leading end of the shoe 31 increases along the arc of the shoe and is transmitted through the link 38 to the leading end of the shoe 33, forcing the shoe 33 into engagement with the drum. This increased force continues to wrap-up and increase along the shoe 33 and is transmitted from the trailing end of the shoe 33 through the link 39 to the leading end of the shoe 32 where the forces continue to wrap-up and increase along the arc of the shoe 32. This increased force is considerably larger than the initial actuating force in the cylinder 35 so that the piston rod 37 is pushed inwardly of the cylinder 35 and the shoe 32 abuts the anchor 32A. The anchor 32A, which is fixed to a back plate or other non-rotatable member, receives the braking force initiated through the piston rod 36 and increased by the wrap-up effect along the arcs of the shoes as described above. In addition to that increase in the force received at the anchor 32A over the force initiated by the rod 36 at pin joint 31P which is produced by the servo, wrap-up action along the arcs of the respective shoes, the force received at the anchor 32A is increased over that generated at joint 31P by reason of two additional factors obtained through the manner of alternately linking the shoes. First, the angle gamma, defined above, is enlarged as compared to that obtainable with the arrangement illustrated in FIG. 1. Thus, the forces developed in the links 38 and 39, which are compressive forces, are more nearly perpendicularly inclined with respect to lines tangent to the drum at the leading end portions of shoes 33 and 32 so that a larger component of the force in each link member acts in a direction normal to the friction surfaces than in the arrangement illustrated in FIG. 1. Secondly, it will be observed that the force initially applied by the piston rod 36 is required to make substantially two traverses of the circumference of the drum before being received at the anchor 32A. In comparison, the piston force of the FIG. 1 arrangement makes but a single traverse of the inner circumference of the drum and only a partial traverse of the drum in going from the leading end of one shoe to the leading end of an adjacent shoe. The two traverses of the brake actuating force that is obtained by the embodiment of the invention illustrated in FIG. 2 permits the braking force to be greatly increased in a manner analogous to two wraps of a line about a capstan.

As noted hereinabove, five shoes may also be utilized in accordance with the present invention, this arrangement being shown in FIG. 3. Thus, five segmental shoes; namely 51, 52, 53, 54, and 55 are shown with the friction linings thereof engaged against the inner surface of the brake drum 56. To excite the brake, a cylinder 60 having a pair of piston rods 61 and 62 is arranged so that piston rod 61 acts on the end of shoe 51 adjacent an anchor pin 51P afforded therefor, and likewise piston rod 62 is arranged to act on the end of shoe 54 adjacent the anchor pin 54P.

The end of shoe 51 opposite the anchor pin 51P is connected by a strut or link 71 to the end of shoe 53 which is adjacent shoe 52, shoe 52 being skipped by the link 71. The opposite end of shoe 53 is connected by a link 72 to the end of shoe 55 which is adjacent the anchor pin 54P for shoe 54, shoe 54 being skipped by link 72. The end of shoe 55 adjacent the anchor pin 51P for shoe 51 is connected by a link 73 to the end of shoe 52 which is adjacent to shoe 51, shoe 51 being skipped by link 73. The end of shoe 52 adjacent shoe 53 is connected by a link 74 to the end of shoe 54 opposite the anchor pin 54P afforded therefor, shoe 53 being skipped by link 74. Finally, the piston rods 61 and 62 act only on shoes 51 and 54 at the ends thereof adjacent the respective anchor pins, skipping shoe 55.

Figure 3:
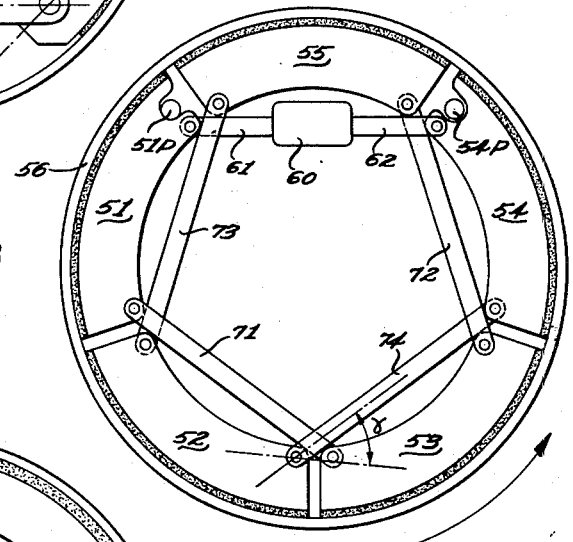
FIG. 3 is an elevation, partly diagrammatic, of another embodiment of the present invention and incorporates five shoes connected by non-articulated linkages.

Thus, it will be seen that assuming the direction of rotation to be counterclockwise as indicated by the arrow in FIG. 3, the trailing end of shoe 51 is connected to the leading end of shoe 53; the trailing end of shoe 53 is connected to the leading end of shoe 55; the trailing end of shoe 55 is connected to the leading end of shoe 52; the trailing end of shoe 52 is connected to the leading end of shoe 54; the trailing end of shoe 54 is engaged by piston 62; and the leading end of shoe 51 is connected to piston 61.

In this instance again, two transits around the drum are required for the braking force created by one piston rod to return to the axis of the other. While the angle gamma is of somewhat lesser value for the five shoe brake as compared to the brake of FIG. 1, several important advantages accrue due to the alternate linkings. The ends of the shoes are adjacent one another, increasing the amount of brake lining and therefore the life of the lining as a whole, and if the ends of the shoes of the brake of FIG. 1 were to be brought equally close together the angle gamma of this brake would be drastically reduced. In addition, because of the increased power afforded by the double wound capstan effect obtained with the brake of FIG. 3 in comparison to that of FIG. 1, brake lining having a less value for the coefficient of friction may be used, and due to the further increase in the number of shoes, a more even distribution of pressure against the drum results.

In view of maintenance and like considerations, a three-shoe brake construction in accordance with the present invention possesses advantages over a five-shoe construction. However, because of the larger angle gamma, as will be evident upon comparing FIGS. 2 and 3, the three-shoe construction of FIG. 2 represents a more powerful brake than the five-shoe construction of FIG. 3. The arrangement illustrated in FIG. 2 is well suited for use as a clutch in that a relatively small actuating force is effective to cause a large torque to be transmitted between the outer drum and inner shoes.

It should be noted that while hydraulic cylinders are illustrated as the means for actuating the various illustrated embodiment of this invention, other means, such as cams, can equally well be used.

Figure 4:
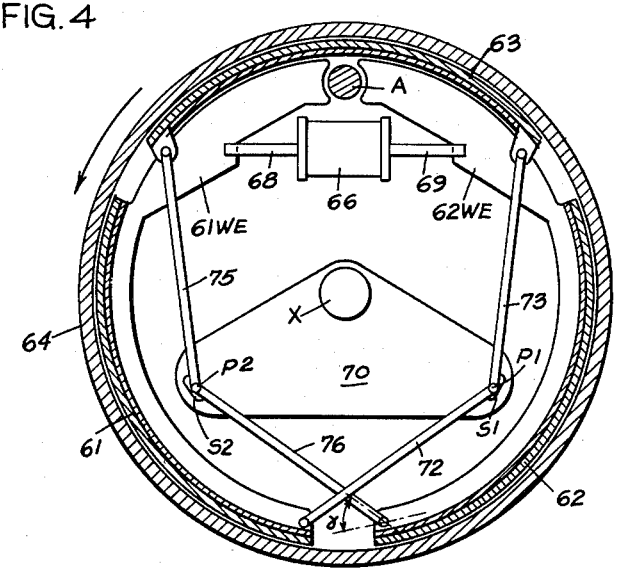
FIG. 4 is an elevation, partly diagrammatic, of another embodiment of the present invention and incorporates three shoes connected by articulated linkages.
Figure 5:
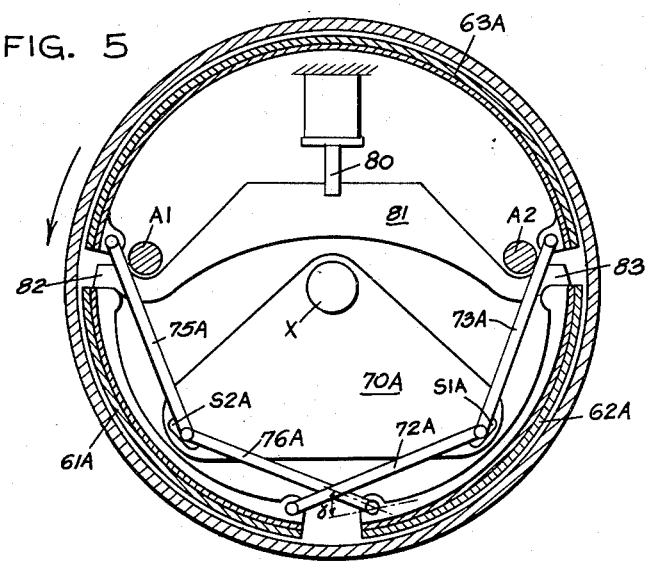
FIG. 5 is a modification of the embodiment illustrated in FIG. 4.

In FIGS. 4 and 5 there are shown modified three-shoe constructions in accordance with the present invention. Articulated links or struts alternately join the shoes in a novel manner, and in reality the links are moved further radially away from the axis of the brake drum in comparison to the FIG. 2 arrangement. That is, the links are brought closer to the drum and reduce the angle gamma in a manner now to be explained.

Thus, referring to FIG. 4, three shoes 61, 62, and 63 are disposed within a brake drum 64. The two shoes 61 and 62 can be considered as one pair with the third or subtended shoe 63 disposed therebetween. In order that leading and trailing ends of the shoes can be used as reference points, it will be assumed that the drum is rotating in the direction of the arrow in FIG. 4. A conventional cylinder 66 having two pistons 68 and 69 associated therewith is operatively supported inside the drum above the axis thereof, and the free ends of the pistons are arranged to act outwardly on intermediate points of extensions 61WE and 62WE of the webs of the shoes 61 and 62. Thus, there is a long web extension 61WE at the leading end of shoe 61 and a like web extension at the trailing end of shoe 62. To enable this construction to be conveniently compact, it will be noted that the subtended shoe 63 is not provided with any web whatsoever and merely comprises the usual pressure plate and brake lining. The ends of the web extensions 61WE and 62WE are formed to be concave and are spaced slightly from one another and terminate at the opposite sides of an anchor A. When the brake is engaged, one or the other of the two web extensions will be forced against the anchor A. With the drum rotating as it is in FIG. 4, this will be the extension 62WE of shoe 62.

A generally triangular shaped web or plate 70 is supported within the drum as by a pivotal mounting affixed to a non-rotating member of the brake. This plate enables the force transmitting links to be articulated in the following manner. An articulated link system 72—73 has the articulating pin P1 thereof slidably disposed in a slot S1 at one side of the plate 70 below the pivot X. The end of the rigid link member 72 opposite the articulated end is pivotally attached to the trailing end of shoe 61, and the like end of the rigid link member 73 is pivotally attached to a depending lug at the leading end of the pressure plate of the subtended shoe 63. Thus, the link system 72—73 by-passes shoe 62 but joins shoes 61 and 63.

The other link system 75—76 is likewise articulated by having the articulating pin or joint member P2 slidably mounted in a slot S2 at the left-hand side of the plate 70 below the axis X. The unarticulated end of the rigid link member 75 is pivotally attached to a depending lug at the trailing end of the subtended shoe 63, whereas the unarticulated end of the rigid link member 76 is pivotally attached to the leading end of shoe 62. The link system 75—76 thus by-passes shoe 61 but joins shoes 62 and 63, and it will be noted that both link systems are connected to the subtended shoe at opposite ends thereof.

When the brake is actuated by supplying operating fluid under pressure to cylinder 66, the two pistons are forced outwardly to expand the two shoes 61 and 62 toward the inside of the drum 64 to bring the brake linings into firm friction contact with the opposed surface of the drum which is to be decelerated. Assuming the drum to be rotating as indicated in FIG. 4, the link system 72—73 is shifted counterclockwise applying compression brake forces to the leading end of the subtended shoe 63. In turn, the trailing end of shoe 63 causes compression to be applied to the link members 75 and 76 which in turn apply braking force to the leading end of shoe 62 at the angle gamma which is also the angle at which forces are applied to the leading end of shoe 63. This force wraps up along the length of shoe 62 back towards piston 69, and in this manner substantially two circuits of the brake force have been established about the shoe assembly which can be viewed as two wraps of a rope around a capstan.

The slots in the plate 70 serve to prevent radial movement, permitting tangential movement of the pin joints P1 and P2 so that a frictional force developed along the arc of one brake shoe and tending to produce circumferential movement of the shoe is transmitted through the pin joints of the articulated linkages as a compressive force in the linkages to engage another shoe with the drum. The illustrated slotted plate 70 could be replaced by a pair of arms each pivotally connected at one end to pivot X, so as to be movable one with respect to the other, and pin jointed with the articulated linkages as at P1 and P2.

The brake structure of FIG. 5 is similar to that of FIG. 4, and reference characters having the suffix "A" have been used to identify similar parts. In this instance, however, the angle gamma has been made even smaller by enlarging plate 70A to bring the articulating slots S1A and S2A closer to the drum. Additionally, shoes 61A and 62A are shorter in comparison to shoes 61 and 62, and the difference is taken up by lengthening the subtended shoe in FIG. 5 as will be readily apparent upon comparing the length of the subtended shoes 63 and 63A inside a drum of common dimensions.

It will be noted that there is but one piston, 80, for actuating the FIG. 5 brake. The free end of this piston is positioned to act on the center point of an actuating arm 81 which has ends 82 and 83 in engagement respectively with the flat trailing and leading end surfaces of the shoes 61A and 62A. The two end portions of arm 81 are adapted to contact anchors A1 and A2 which serve to limit shoe movement as in the foregoing embodiments.

In all of the embodiments described hereinabove the end-to-end connections cause a self-energization or wrap-up force to be transmitted from the shoe connected to the expansion cylinder through succeeding shoes and to the anchor pin. In some applications the coefficient of friction of the friction materials involved may make it desirable that such an increase in the braking effort be avoided.

Figure 6:
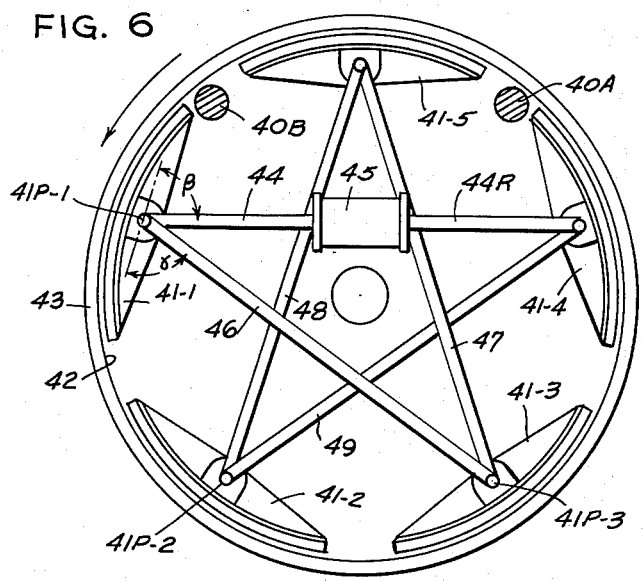
FIG. 6 is an elevation, partly diagrammatic, of an embodiment of this invention which incorporates non-articulated linkages connecting alternate shoes at their central portions.

It is not essential that the shoes be linked at their ends, and FIG. 6 illustrates an embodiment of this invention wherein alternate torque shoes are connected at their central portions by a non-articulated linkage. This arrangement accomplishes a large braking force by reason of the two circuits of the drum by the actuating force and the large angle gamma provided. This large force is obtained without any wrap-up along the length of the shoes.

In the FIG. 6 embodiment a plurality of arcuate shoes 41–1 to 41–5 are arrayed along the inner circumference of a rotatable outer drum 43. A double ended expansion cylinder 45 is connected to shoes 41–1 and 41–4 by means of piston rods 44 and 44R respectively. The rod 44 is connected to the shoe 41–1 in a pin joint connection 41P–1 supported in the central portion of the web of the brake shoe 41–1. Linkages 46 through 49 cross link the brake shoes 41–1 through 41–5 in an alternate manner so that a link such as 46 connects alternate shoes 41–1 and 41–3 at centrally disposed pin joints 41P–1 and 41P–3 and by-passes the intermediate or subtended shoe 41–2. Anchor pins 40A and 40B are positioned adjacent shoes 41–4 and 41–1 respectively to limit the circumferential movement of these shoes.

In operation the first torque shoe 41–1 receives a force tending to expand the torque shoe radially outwardly and into frictional engagement with the inner face 42 of the rotatable outer drum 43 through the linkage 44. The expansion force is transmitted to the torque shoe 41–1 through the pivot 41P–1. It should be noted that in this instance the angle beta is a relatively large angle so that a large portion of the expansion force tends to act directly radially outwardly on the brake shoe 41. Engagement of the shoe 41–1 with the outer drum causes movement of the link 46 radially outwardly and results in engagement of shoe 41–3 with the drum with a compressive force produced in link 46. Engagement of shoe 41–3 with the drum in turn moves link 47 to cause engagement of shoe 41–5 with the drum. In like manner shoes 41–2 and 41–4 are caused to move into engagement with the drum. With the counterclockwise direction of rotation as indicated by the arrow, pin 40A serves as the anchor for the brake shoe 41–4.

The forces in the struts 46, 47, 48, and 49 are multiplied exponentially due to the successive additions of the friction forces of each shoe so that the pressure force actuating the shoe 41–4 into engagement with the drum is much greater than that acting on the shoe 41–1 through the rod 44.

It can be seen from an inspection of FIG. 6 that by reason of the central location of the pivot joints 41P, angles beta and gamma, formed by the respective links 44 and 46 with a line tangent to the surface of the brake shoe at 41P, are substantially equal.

This center-to-center linkage provides a higher angle beta than that provided by an end-to-end linkage as illustrated in FIG. 3. Thus the FIG. 6 center-to-center linkage results in a very powerful brake. While such center-to-center linkage does not provide a wrap-up or belt effect through the length of any shoe, this linkage does produce a large braking force by providing a large angle gamma and two transits of the inner circumference of the drum 43 before a force generated within the expansion means 45 and transmitted to the shoe 41–1 through the linkage 44, is received at the anchor 40A.

Depending upon the material selected, the FIG. 6 embodiment may provide an undesirably high braking force by reason of the large angle beta that is involved. Thus if a material having a high coefficient of friction is employed as a lining for the shoes in the FIG. 6 embodiment, it might be possible to get a lock-up rather than a controlled braking action. Such a large braking action having a lock-up characteristic is fine for a lock-up clutch but is undesirable in most braking applications.

Figure 7:
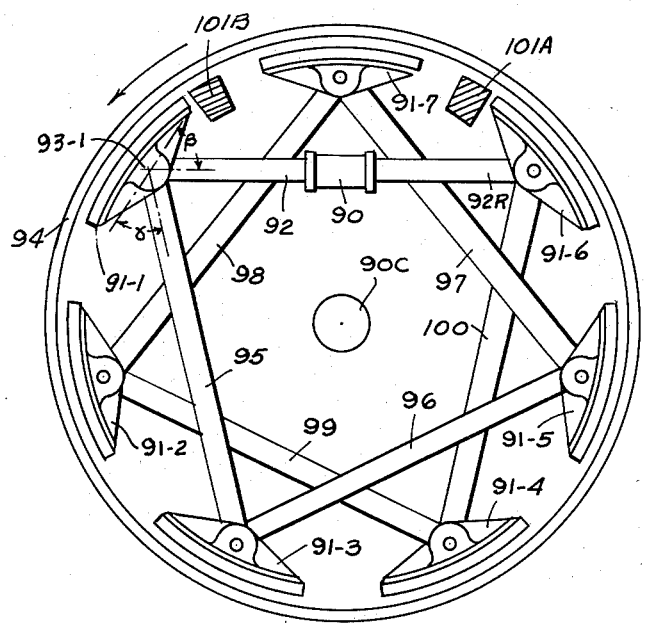
FIG. 7 is an elevation, partly diagrammatic, of another embodiment of this invention somewhat similar to the FIG. 6 embodiment but including additional shoes.

In view of the foregoing, FIG. 7 illustrates an embodiment of the invention wherein two additional shoes are employed to reduce the angles beta and gamma as compared to the angle beta in the FIG. 6 embodiment. Thus, seven shoes are employed rather than five shoes as in the FIG. 6 embodiment. The manner of interconnecting the shoes is otherwise similar to that of the FIG. 6 embodiment. Thus, an expansion cylinder 90 transmits the initial force to a first torque shoe 91–1 through a linkage 92. The linkage 92 is connected to the torque shoe 91–1 through a pin joint 93–1 located at the central portion of the torque shoe. The force thus transmitted to the shoe 91–1 tends to force the torque shoe 91–1 outwardly to bring the lining thereon into frictional engagement with the inner surface of the rotatable outer drum. The linkage 95 interconnects brake shoe 91–1 with an alternate shoe 91–3 and permits a compressive force to be transmitted from the brake shoe 91–1 to the brake shoe 91–3. In like manner linkages 95–100, connected to alternate shoes, transfer compressive forces between the shoes, which forces increase exponentially from the cylinder around to the anchor 101A which abuts the end of shoe 91–6 when the direction of rotation of the outer drum is as indicated by the arrow of FIG. 7.

By incorporating seven shoes, the FIG. 7 embodiment permits the linkages interconnecting the various shoes to be removed a greater distance from the center of rotation 90C as compared to the FIG. 6 embodiment. This decreases the magnitude of the angles beta and gamma and removes the performance farther from the undesirable lock-up area.

Figure 8:
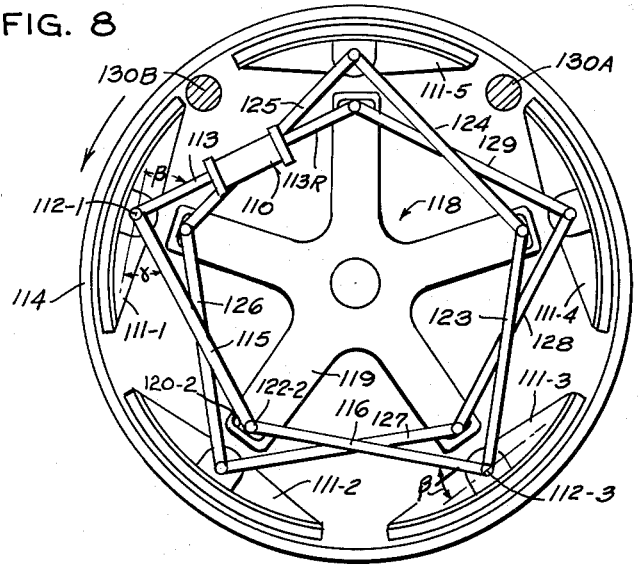
FIG. 8 is an elevation, partly diagrammatic, of another embodiment of this invention wherein alternate shoes are connected at their central portions by articulated linkages.

FIG. 8 illustrates an embodiment wherein the angles beta and gamma are further reduced in magnitude as compared to the FIGS. 6 and 7 embodiments. This is accomplished by utilizing an articulated linkage between the shoes rather than a one-piece unitary linkage as illustrated in the FIGS. 6 and 7 embodiments.

In the embodiment of FIG. 8 a rotatable outer drum 114 has arrayed along its inner face a plurality of brake shoes 111–1 through 111–5. A spider 118 is fixed in a non-rotatable manner within the central portion of the drum 114. The spider comprises radially projecting arms 119 which have slotted guides 120 formed within their outermost extremities. An expansion cylinder 110 has a piston rod 113 connected in a pin joint connection 112–1 to a first brake shoe 111–1. An articulated connection 115, 116 is connected in pin joint connections 112–1 and 112–3 at its opposite ends to the brake shoes 111–1 and 111–3 respectively. The pin joints 112 are supported in the central portion of the webs of the shoes 111. The point of articulation 122–2 of the articulated connection 115, 116 is contained within the slotted guide 120–2 of the radial arm of the spider that projects outwardly toward an intermediate shoe 111–2. In like manner the shoes 111–3, 111–5, 111–2, and 111–4 are interconnected by the linkages 123 through 128. An articulated linkage 129, 113R completes the connection from the brake shoe 111–4 back to the expansion cylinder 110.

Anchor pins 130A and 130B are positioned within the drum 114 in a non-rotatable manner so as to restrict the extent of the circumferential movement of the shoes 111–4 and 111–1 respectively.

In operation the expansion cylinder 110 transmits a force to the first shoe 111–1 at the pin joint 112 through the rod 113. This force tends to move the shoe 111–1 outwardly and into frictional engagement with the rotatable outer drum 114. Assuming the rotation of the outer drum to be the direction indicated by the arrow, the articulated link 115, 116 transmits a compressive force from the pin joint 112 of the first shoe 111–1 to pin joint 112-3 of the shoe 111-3 to cause the shoe 111-3 to move into engagement with the drum. The radial component of the force at the point of articulation 122-2 is transmitted to the arm 119 of the spider 118 through the outerwall of the slotted guide 120-2. The slotted guide 120-2 permits the tangential component of the force in link 115 to be transmitted to link 116. In like manner the shoes 111-5, 111-2, and 111-4 are moved into engagement with the outer drum through the action of the linkages 123—129. The pressure forces thus transmitted through the shoes and linkages increase exponentially so that rod 113R is pushed inward of the cylinder and the shoe 111-4 abuts the anchor 130A.

Thus it can be seen that this articulated construction permits the compressive force to be transmitted to the torque shoe 111-3 at an angle gamma having substantially lesser magnitude than the angle gamma as obtained with the FIGS. 6 and 7 embodiments.

As in all the other disclosed embodiments a force initially applied to the first torque shoe, having expansion means such as 110, traverses the inner circumference of the rotatable drum 114 twice before being received at the anchor point.

Figure 9:
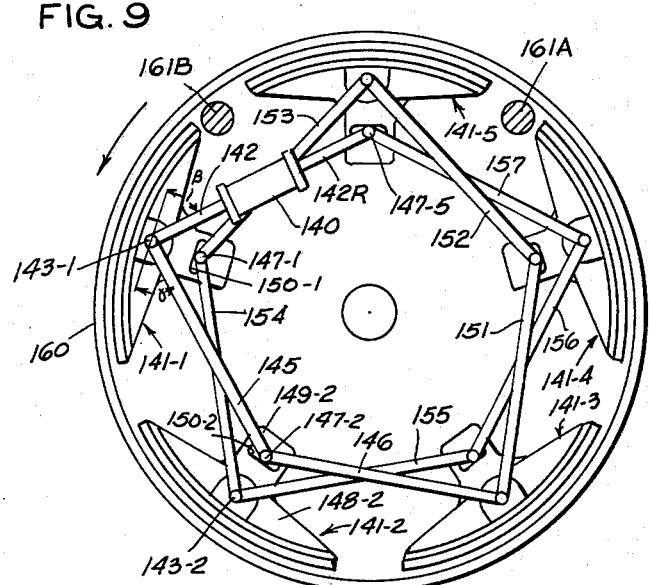
FIG. 9 is an elevation, partly diagrammatic, of another embodiment of this invention wherein articulated linkages connecting the central portions of alternate shoes have points of articulation contained within guides formed on intermediate shoes.

FIG. 9 illustrates an embodiment of this invention wherein the slotted guides that receive the points of articulation of the torque shoe connecting linkages are contained on the torque shoes rather than being contained in a spider assembly as in FIG. 8. This provides a regenerative force in a member hereinafter to be described.

In the embodiment illustrated in FIG. 9 a plurality of shoes 141-1 through 141-5 are arrayed along the inner circumference of the rotatable drum 160. Each of the shoes has a lug 149 projecting radially inward from and formed integral with the web 148. A slotted guide 150 is formed within the lug 149. An expansion cylinder has piston rods 142 and 142R projecting from opposite ends. The rod 142 is connected to a first shoe 141-1 at a pin joint connection 143-1. An articulate linkage 145, 146 connects the shoes 141-1 with shoe 141-3. The point of articulation 147-2 of the linkage 145, 146 is contained within the slotted guide 150-2 formed in the lug of an intermediate shoe 141-2. Shoe 141-3 is connected to the shoe 141-5 by an articulated linkage 151, 152. In like manner linkages 153, 154, and 155, 156 interconnect shoes 141-5 to 141-2 and 141-2 to 141-4. In each instance the point of articulation of the respective linkages is contained within a guide formed within the lug of an intermediate shoe. Link 157 is connected to the above mentioned rod 142R in a pin joint connection 147-5 contained within a guide formed in the lug of the shoe 141-5. Anchor pins 161A and 161B are disposed adjacent end portions of the shoes 141-4 and 141-1 respectively and are operative to restrict circumferential movement of these shoes.

Because these linkages are farther removed from the central point of the outer rotatable drum 160, the angles beta and gamma are reduced in magnitude as compared to any of the FIGS. 6 through 8 embodiments disclosed above.

In operation, a force generated within the expansion means 140 and transmitted to the first torque shoe 141-1 causes the torque shoe 141 to move into frictional engagement with the outer rotatable drum 160. This in turn causes a compressive force to be transmitted through the articulated connection 145, 146 to the torque shoe 141-3. The torque shoe 141-3 thus is moved outwardly into frictional engagement with the rotatable drum 160 and causes a compressive force to be transmitted through the linkage members 151 and 152 to the torque shoe 141-5. In like manner compressive forces are transmitted through the linkages 153 to 156 to the torque shoe 141-4 which is moved into abutting relation with the anchor 161A with the direction of rotation of the outer drum as indicated by the arrow.

In this respect, the action of the expansion means 140 on brake shoes and linkages interconnecting the brake shoes is like that disclosed in relation to the embodiment illustrated in FIG. 8. However, the mounting of the lugs 149 with the slotted guides 150 directly on the shoes 141 in the embodiment illustrated in FIG. 9 produces a beneficial result not obtained in the embodiment illustrated in FIG. 8, in which the slotted guides are formed within a spider assembly 118 which is independent of the torque shoes. This beneficial result is a transmission of a regenerative force to the shoes 141. The manner in which this regenerative force is developed will now be described hereinbelow.

A force transmitted from the expansion means 140 to the first torque shoe 141-1 has a component which tends to shift the pivot 143-1 in a direction such that the link member 145 would be moved downwardly as viewed in FIG. 9. The engagement of the torque shoe 141-1 with the rotatable drum 160 also tends to cause downward movement of the link member 145 when the direction of rotation of the drum 160 is as indicated. The extent of the movement of the link member 145 in a downward direction is restricted by reason of the anchor 161A abutting the shoe 141-4 as disclosed above. Thus it can be seen that a compressive force is developed within the link member 145. This compressive force is transmitted back to the shoe 141-1 in a regenerative fashion through the point of articulation 147-1 and the slotted guide 150-1. Specifically, the compressive force developed within the link 145 is transmitted through the link member 146 and linkages 151 to 153 to the pin joint 147-1. This force within the link member 153 has both a tangential component and a radial component. The tangential component acts on the link 154 to shift the link 154 longitudinally downwardly and cause the shoe 141-2 to move into braking engagement with the drum. However, the radial component is applied to the shoe 141-1 rather than a fixed supporting structure like the spider 118 of the embodiment illustrated in FIG. 8. The radial component acts on the outer side of the slotted guide 150-1 and adds to the radial component of the force developed within the cylinder 142 pressing the shoe 141-1 outwardly into engagement with the drum.

In this manner both a first braking force and a second, regenerative braking force are applied to an individual torque shoe. The second, regenerative force is a function of the first force as amplified by the friction forces of the individual shoe and alternate interlinked shoes. Further, the individual shoes in the embodiment illustrated in FIG. 9 are subjected to one braking force which corresponds to that applied to a corresponding shoe in the arrangement illustrated in FIG. 8 and are also subjected to an additional force which is not present in the arrangement illustrated in FIG. 8. A specific example will clarify this. In comparing the forces acting on the initial brake shoes 111-1 and 141-1 in the respective arrangements illustrated in FIGS. 8 and 9, it is seen that in each arrangement a braking force is applied to the shoes by the cylinders 110 and 140. The radial components of the forces in the piston rods move the shoes outwardly and into engagement with the rotating drum. The tangential components are added to the frictional forces developed on the surfaces of the brake shoes and are transmitted to the respective links 115 and 145 as compressive forces, assuming that in each arrangement the linkages have been moved outwardly a sufficient amount to engage the shoes 111-4 and 141-4 with the respective anchors 130A and 161A. In the arrangement illustrated in FIG. 8 the force transmitted through the link 115 is increased by the friction forces of shoes 111-3 and 111-5 and is developed as a compressive force in link 125 for transmission to the shoe 111-2. However, the force in this link is received by the spider 118 and thus has no effect on the braking effort applied to the shoe 111-1 so that only the force in the piston rod actuates the first shoe. In the arrangement illustrated in FIG. 9 the compressive force transmitted through the link 145 is increased by the friction forces of the third and fifth shoes 141–3 and 141–5 and is transmitted to the second shoe 141–2 in the same manner as described in the arrangement illustrated in FIG. 8. However, the radial component of this force in link 153 in the arrangement illustrated in FIG. 9 is applied to the first shoe 141–1 in a regenerative manner through the pin joint 147–1 rather than being received by a fixed support member. Thus, the arrangement illustrated in FIG. 9 applies the radial components of the forces at the articulated pin joints in a regenerative manner to obtain a braking effort from these forces that is lost in the arrangement illustrated in FIG. 8. Also, analogous to an electrical circuit, the arrangement illustrated in FIG. 9 may be considered to have a first force input circuit comprising the links 142, 145, 146, 151, and 152, and a force output circuit comprising the links 153 to 156. The force input circuit transmits a first force to the individual shoes, and the force output circuit, by transmitting a second force to the individual shoes, adds to the force developed in the input circuit in a regenerative manner to increase the overall braking force.

The arrangements illustrated in FIGS. 8 and 9 are alike in employing alternately, articulately linked shoes in a manner such that a braking force transmitted to a selected point one brake shoe is transmitted to a corresponding point on an adjacent torque shoe through additional torque shoes spaced about the circumference of the drum to provide a transit of the circumference of the drum by the force and a correspondingly increased braking force over that obtainable by a direct connection between the two points.

The arrangements are different in that the embodiment illustrated in FIG. 9 utilizes the radial forces at the points of articulation to obtain an additional braking force on each torque shoe.

Figure 10:
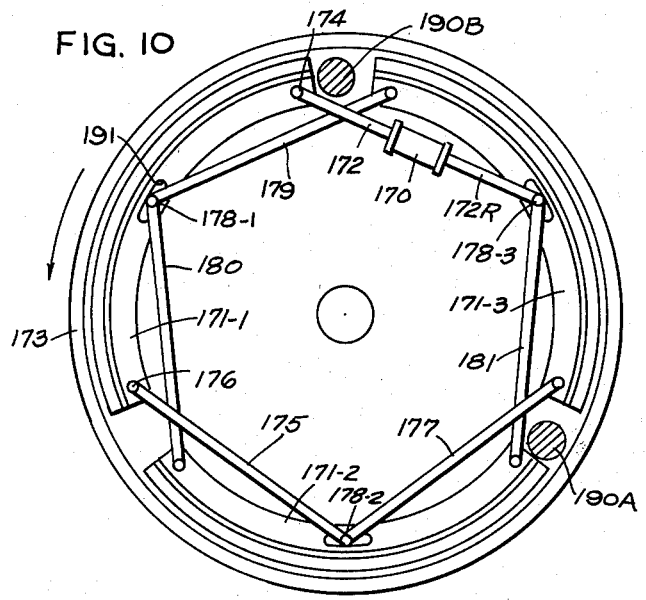
FIG. 10 is an elevation, partly diagrammatic, of another embodiment of this invention wherein articulated linkages connecting end portions of alternating shoes have points of articulation contained within guides formed on intermediate shoes.

FIG. 10 illustrates an embodiment of this invention wherein a regenerative force is obtained with shoes that are cross-linked at their end points as distinguished from the shoes of the FIG. 9 embodiment which are cross-linked at their central portions.

In FIG. 10 a double ended cylinder piston assembly 170 is illustrated as a means to expand the brake shoes outwardly and into engagement with the rotatable drum 173, but as in all other embodiments of the invention, it will be appreciated that such is simply a preferred mode of achieving a highly effective initial force engendering the servo expansion. Thus, a link 172 transmits a piston force from the cylinder 170 to a first brake shoe 171–1 through a pin joint 174. Pin joint 174 is located at the one end of the brake shoe 171–1. At the opposite end a link member 175 is connected to the brake shoe 171–1 through a pin joint 176. A link member 177 is connected to the link member 175 by pin joint 178 and the two link members 175 and 177 form an articulated connection between the torque shoes 171–1 and 171–3. Additional linkages 179, 180, 181, and 172R complete the circuit to the expansion means 170. An anchor 190A is disposed adjacent to one edge of the torque shoe 171–2 so as to restrict movement of the brake shoes 171 in a circumferential direction when the outer drum is rotating in the direction indicated by the arrow in FIG. 10.

In the operation of the brake of this embodiment, a force transmitted by the expansion means 170 to the first torque shoe 171–1 through the link 172 causes the brake shoe 171–1 to move outwardly and into frictional engagement with the inner surface of the rotatable drum 173. A portion of this force and an additional force due to the wrap-up or belt effect of the brake shoe 171–1 with the drum 173 is transmitted through the brake shoe 171 to the articulated linkage 175, 177. This force, transmitted through link member 177 to the torque shoe 171–3, causes the brake shoe 171–3 to move outwardly and into engagement with the drum. An additional force due to the wrap-up of the shoe 171–3 along the drum 173 is transmitted through the link member 179 to the pivot 178–1 and through the outwardmost wall of the slotted guide 191 back to the torque shoe 171–1 in a regenerative manner. This embodiment of the invention provides a very high degree of braking effort because the self-energizing wrap-up effect of each shoe is obtained in addition to both the multiplied braking effort obtained as a result of the multiple transit about the inner circumference of the drum through the cross-linked construction and the increased, regenerative braking force obtained as a result of mounting the supports for the articulated links directly on the torque shoes.

Figure 11:
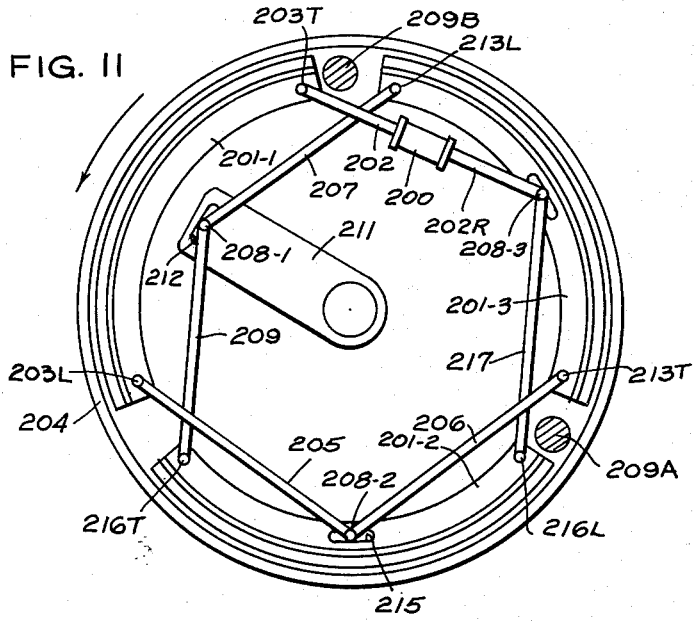
FIG. 11 is an elevation, partly diagrammatic, of another embodiment of this invention wherein articulated linkages interconnecting the end portions of alternate shoes have points of articulation contained within guides formed on intermediate shoes and wherein one articulated linkage has a point of articulation contained within a guide independent of the shoes.

FIG. 11 illustrates an embodiment of the invention wherein the regenerative force is removed from one of the torque shoes. Due to the geometry of the structure involved in the FIG. 10 embodiment, the force applied to the second torque shoe 171–2 through the articulated pivot 178–2 is a well-regulated force. However, the regenerative force applied to the torque shoe 171–1 increases quite rapidly with increases in the initial force generated in the expansion means 170; therefore, it may be desirable with linings having a relatively high coefficient of friction to remove this regenerative force from one of the shoes.

Thus, FIG. 11 illustrates an embodiment of this invention wherein the regenerative force is removed from one of the shoes.

In the embodiment illustrated by FIG. 11, shoes 201–1, 201–2 and 201–3 are disposed along the inner circumference of a rotatable drum 204 in adjacent and substantially end-to-end relationship, as in all other embodiments. A non-rotatable arm or bracket 211 is fixed within the outer drum and extends radially toward the shoe 201–1. A slotted guide 212 is formed within the outermost extremity of the arm 211. An expansion cylinder 200 has piston rods 202 and 202R projecting from opposite ends. The rod 202 is connected in a pin joint connection 203T to one end of a first torque shoe 201–1. At its opposite end shoe 201–1 is connected at the pin joint 203L to an articulated linkage 205, 206. The portion 206 of the linkage 205, 206 is connected at a pin joint connection 213T to a torque shoe 201–3. The point of articulation 208–2 of the articulated linkage 205, 206 is contained within a slotted guide 215 formed in the web of the shoe 201–2. The shoe 201–3 is connected to the shoe 201–2 through an articulated linkage 207, 209 having pin joint connections 213L and 216T at opposite ends on the shoes 201–3 and 201–2 respectively. The point of articulation 208–1 is contained within the slotted guide 212 formed in the arm 211, and thus is independent of the shoe 201–1. Link 217 is connected at the pin joint 216L to the brake shoe 201–2 and is connected to the pin joint connection 208–3 at its opposite end to the above mentioned rod 202R, thus completing a closed loop back to the expansion cylinder 200. Anchor pins 209A and 209B are disposed adjacent to the ends of torque shoes 201–2 and 201–1 respectively and are operative to restrict circumferential movement of the torque shoes 201.

In operation the expansion means 200 transmits a force to the first brake shoe 201–1 through the link 202 connected to the brake shoe at the pin joint 202. A component of this force tends to move the brake shoe 201–1 circumferentially in the direction of the arrow. With the rotation of an outer drum 204 as indicated, an additional self-energization wrap-up force is added to the first force mentioned and is transmitted through the articulated linkage 205, 206 to the torque shoe 201–3. This force plus an additional force developed by the self-energization wrap-up effect of the torque shoe 201–3 on the outer drum 204 is then transmitted through the articulated linkage 207, 209 to the torque shoe 201–2. The force within the link 209 is transmitted through the torque shoe 201–2 and an additional self-energization wrap-up force developed by the torque shoe 201–2 is transmitted to an anchor 209A. Because the pin joint connection 208-1 of the articulated link 207, 209, connecting the trailing end of the shoe 201-3 to the leading end of the shoe 201-2, is slidably received within the slotted guide 212, the stationary bracket 212 receives the force transmitted to the pivot 208-1 rather than the brake shoe 201-1.

The slotted, stationary bracket 211 could be replaced by a member pivotally mounted to some non-rotatable structure at its radially innermost end portion and pin jointed with the articulated linkage at 208-1 so as to permit longitudinal movement of the linkages 207 and 209.

The embodiment as illustrated in FIG. 11 provides a brake assembly whereby the braking force is somewhat reduced as compared to that obtained with the FIG. 10 embodiment and is more easily controlled. Depending upon specific materials selected and the intended application, it may be desirable to eliminate the regenerative force from acting on one or more brake shoes by means such as are disclosed in the FIG. 11 embodiment.

Figure 12:
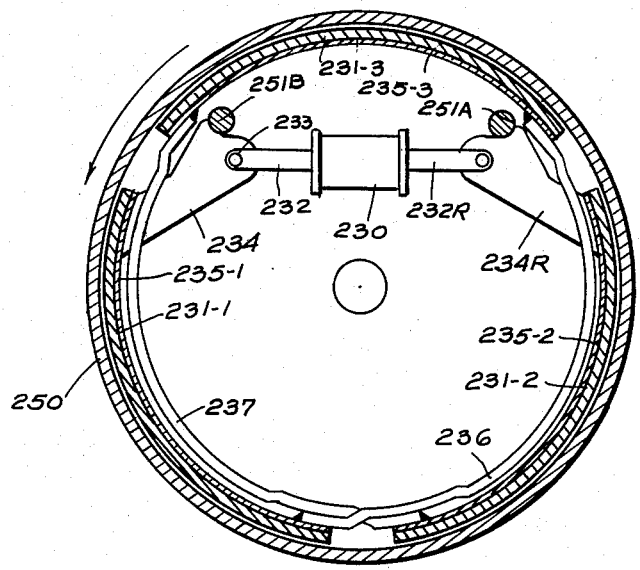
FIG. 12 is an elevation, partly diagrammatic, of another embodiment of this invention wherein alternate flexible shoes are interlinked by flexible connectors.

FIG. 12 illustrates another embodiment of this invention and in this instance highly flexible support plates and highly flexible connecting links are utilized to increase the braking force developed within the usual expansion means. The flexible connecting links and the flexible support plates coact to provide a regenerative force that is continuously applied along the adjacent flexible support plate in a manner to be hereinafter described. By "flexible" is meant a metallic member which will freely bend upon a brake force being applied thereto as distinguished from the shoes and the webs at the back of the shoes in the FIGS. 2 to 11 embodiments. As will be more fully explained hereinafter, a highly flexible support plate permits the amount of the wrap-up force obtained in end-to-end linked shoes to be greatly increased over that which can be obtained with shoes having relatively inflexible webs and support plates. Flexibility can be achieved by using thin sections.

An expansion cylinder 230 has a rod 232 connected in a pin joint connection 233 to an arm 234 which is attached to the flexible support plate 235 of a first torque shoe 231-1. Thus, the shoes in this embodiment, in order to have a degree of flexibility, are not provided with webs as are those illustrated in FIGS. 6 to 11. The arm 234 is attached to the leading end of the shoe 231-1, considering the direction of rotation of an outer drum 250 to be as indicated by the arrow in FIG. 12. A flexible metal plate connector 236 connects the trailing end of the torque shoe 231-1 to the leading end of the torque shoe 231-3. The trailing end of the torque shoe 231-3 is connected to the leading end of the torque shoe 231-2 by a second flexible connector 237. An arm 234R and a rod 232R complete the connection back to the cylinder 230. Non-rotatable anchors 251A and 251B are fixed inwardly of the outer drum 250. The arms 234 and 234R have lug portions which are adapted to abut the anchors 251B and 251A respectively. The connectors 236 and 237 may be seen to be disposed closely adjacent to the respective flexible support plates 235-1 and 235-2.

In operation, a force generated within the cylinder 230 is transmitted through the rod 232 and arm 234 to the support plate 235-1 of the first brake shoe. This force causes the brake shoe 231-1 to move outwardly and into frictional engagement with the inner surface of the rotatable drum 250. The flexible nature of the support plate 235-1 permits the servo and wrap-up force to be developed to a very high degree in a point-by-point manner. This wrap-up force may be considered as analogous to the frictional wrap-up of a flexible belt gradually tensioned into engagement with a pulley. This servo force is transmitted through the flexible connector 236 as a compressive force and tends to bow the connector 236 radially outwardly and into continuous physical engagement with the support plate 231-2 in a uniform manner. The flexible connector 236 acts as a force transmission member, like the connecting linkages in all the other embodiments, by transmitting the self-energization servo force of the shoe 231-1 to the shoe 231-3. The flexible support plate 235-3 is bowed outwardly to engage the lining of the brake shoe 231-3 in frictional engagement with the inner surface of the rotatable drum 250. The self-energization force of the brake shoe 231-3 is added to the force transmitted through the connector 236 and the resultant force is transmitted as a compressive force through the flexible connector 237 to the brake shoe 231-2. The compressive force transmitted to the brake shoe 231-2 by the connector 237, and an additional servo force due to the self-energization wrap-up of the brake shoe 231-2 against the drum 250 is then transmitted through the arm 234R to the anchor 251A, assuming still that the drum 250 is rotating in the direction of the arrow.

Thus it will be seen that both connectors 236 and 237 are operative to transmit a compressive force between alternate brake shoes in the manner disclosed in the description of the previous embodiments.

The flexible connectors 236 and 237 in the FIG. 12 embodiment provide an additional, highly significant braking effort. Thus the compressive force causing the links 236 and 237 to bow outwardly into engagement with the flexible support plates 235-2 and 235-1 provide an additional regenerative force, which, rather than being applied to a localized area as in the FIG. 10 embodiment, for example, is applied continuously along the support plates of the respective brake shoes 231-2 and 231-1. By utilizing both flexible connectors and flexible supporting plates the maximum servo or belt effect is obtained to correspondingly provide greater multiplication of braking effort.

Figure 13:
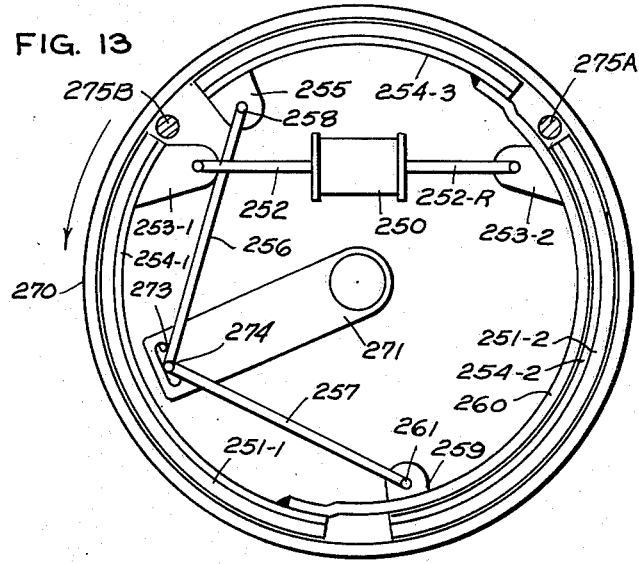
FIG. 13 is an elevation, partly diagrammatic, of an embodiment of this invention wherein both an articulated linkage and a flexible linkage are utilized to connect alternate shoes.

As disclosed in relation to the FIG. 10 embodiment, it may be desirable with certain facing or lining materials for the shoes having relatively high coefficients of friction to eliminate the regenerative force on the first brake shoe. FIG. 13 illustrates an embodiment which accomplishes this objective in a brake utilizing flexible connectors.

In FIG. 13, the expansion cylinder 250 has rods 252 and 252R connected to arms 253-1 and 253-2 formed on brake shoes 251-1 and 251-2. Assuming a direction of rotation of an outer drum 270 as indicated by the arrow in FIG. 13, the arm 253-1 is attached to the leading end of a flexible support plate 254-1. A flexible connector 260 is attached to the trailing end of support plate 254-1 and is attached at its opposite end to the leading end of a support plate 254-3. An arm 255 is mounted on the trailing end of the support plate 254-3 and articulated connectors 256 and 257 are pivoted on the arm 255 at pin joint 258. The other end of the articulated connection 256 and 257 is connected to an arm 259 formed on the support plate 254-2 of the brake shoe 251-2. A non-rotatable arm 271 is fixed inwardly of the rotatable drum 270 and extends radially out toward the brake shoe 251-1. A slotted guide 273 is formed in the arm 271 and receives the point of articulation 274 formed in the connector 256, 257. Anchors 275A and 275B are fixed inwardly of the rotatable drum and limit the movement of the brake shoes in a circumferential direction. Thus, the brake shoe 251-2 will move into an abutting relation with the anchor 275A when the direction of the rotation of the drum 270 is as indicated by the arrow on FIG. 13.

The operation of the embodiment illustrated in FIG. 13 is similar to that described in relation to FIG. 12 in the compressive force transmitting characteristics of the connectors 260 and 256, 257. Thus an expansion force transmitted to the first brake shoe 254-1 upon actuation of expansion cylinder 250 generates a belt-type, servo, wrap-up force in the shoe 251-1 which is transmitted as a compressive force within the connector 260 to the brake shoe 254-3. The compressive force within connector 260 is transmitted through the brake shoe 254-3 and this force plus the servo, wrap-up force of the brake shoe 254-3 is transmitted as a compressive force through the articulated connector 256 and 257 to the brake shoe 251-2. The force continues to wrap-up in the brake shoe 251-2 and is transmitted to the anchor 275A.

Thus the brake shoe 251-2 receives a force through the link 257 which is the function of the initial force generated within the cylinder 250, as multiplied by the capstan effect obtained by the traverse of the force around the inner circumference of the drum 270 and receives an additional continuous regenerative force due to the engagement with the flexible connector 260. However, the regenerative force which could be applied by connectors 256 and 257 to the brake shoe 254-1 is in effect by-passed around this brake shoe by the articulated linkage and fixed guide assembly 274 and 273. As compared to the embodiment illustrated in FIG. 12, the FIG. 13 embodiment permits a more controlled braking action with materials having a relatively high coefficient of friction.

Figure 14:
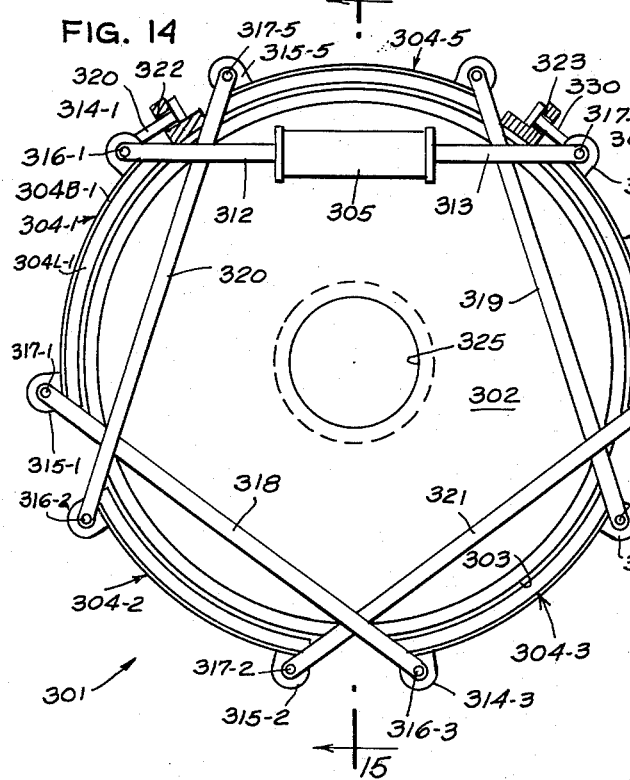
FIG. 14 is an elevation, partly diagrammatic, of another embodiment of this invention wherein the shoes are contracted into frictional contact with an external surface of a rotatable member.
Figure 15:
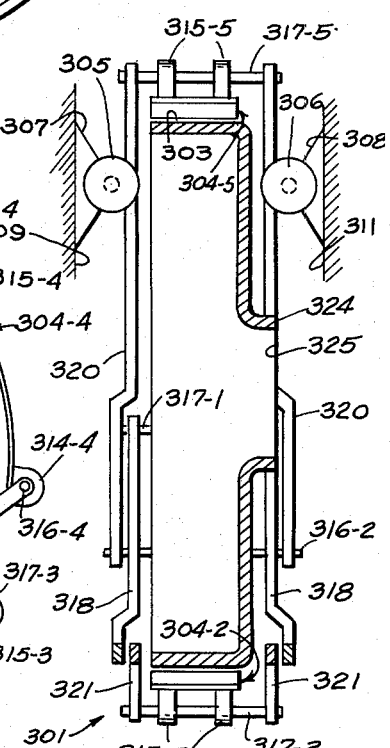
FIG. 15 is a sectional view taken in the direction of the arrows 15—15 in FIG. 14.

While the friction couples heretofore described have been of the type wherein a plurality of torque shoes are moved radially outwardly into frictional engagement with an inner cylindrical surface of a rotating drum, the principles of this invention are not limited to such an internal expanding type of friction couple but may equally well be applied to an external contracting type of friction couple. FIGS. 14 and 15 illustrate one external contracting type of friction couple constructed in accordance with this invention.

In FIGS. 14 and 15 an external contracting type of friction couple is designated generally by the reference numeral 301 and comprises a rotatable drum 302 which has an outer cylindrical surface 303. A plurality of arcuately shaped torque shoes 304-1 through 304-5 are arrayed along the cylindrical surface 303 in adjacent end-to-end relation. Each of the torque shoes 304 comprises a lining 304L which is engageable with the cylindrical surface of the drum and which is bonded or otherwise attached to a flexible backing plate 304B of the shoe. The flexibility afforded by this construction permits each torque shoe to conform to the cylindrical surface of the drum so as to engage all of the inner face of the lining in intimate friction transmitting relation with the rotating drum upon actuation of the shoes radially inwardly in a manner described hereinbelow.

Each of the torque shoes 304 is movable in a radial direction into and out of frictional engagement with the outer cylindrical surface 303 and is also movable to a limited extent in a circumferential direction by such frictional engagement. The means for moving the torque shoes radially inwardly comprise both actuating means, shown as two double piston hydraulic cylinders 305 and 306, and a force transmitting linkage which interconnects the torque shoes 304 in a manner such that opposite ends of alternate torque shoes are directly connected together.

The actuating cylinders 305 and 306 are disposed on opposite sides of the friction couple 301 and are mounted by flanges 307 and 308 to some non-rotatable stator structure such as the surfaces 309 and 311. Each cylinder has piston rods 312 and 313 projecting axially outwardly from opposite ends of the cylinder. The piston rods 312 and 313 are connected to internal pistons which retract the piston rods axially inwardly of the cylinders upon a fluid pressure being transmitted to the cylinder.

Each of the torque shoes 304 has a pair of radially projecting lugs 314 attached to the flexible backing plate 304B at one end of the shoe and a like pair of lugs 315 at an opposite end of the shoe. Pins 316 and 317 are rotatably mounted within each pair of lugs 314 and 315 respectively and project outwardly beyond the sides of the torque shoes 304 as viewed in FIG. 15.

The outermost ends of the piston rods 312 and 313 are connected to the pins 316-1 and 317-4 respectively. Thus, the actuating cylinder 305 is operative to apply an actuating force through pin joint connections to one end of each of the torque shoes 301-1 and 301-4.

The force transmitting linkage which interconnects the torque shoes comprises four pairs of link members 318 to 321. Each link member is connected at opposite ends to a projecting end of a pin 317 on one end of one shoe and a pin 316 on an opposite end of an alternate shoe. Thus, and assuming a clockwise direction of rotation of the drum 302, one end of the link 318 is connected to the leading end of the shoe 304-1 through a pin joint connection afforded by the lugs 315-1 and the pin 317-1, and the other end of the link 318 is connected to the trailing end of the shoe 304-3 through a pin joint connection afforded by the lugs 314-3 and the pin 316-3.

A pair of anchors 322 and 323 are mounted on some non-rotatable stator structure so as to be disposed adjacent one end of each of the shoes 304-1 and 304-4 respectively, and drag links 320 and 330 are welded or otherwise attached to these ends of the respective shoes 304-1 and 304-4. The drag links are slidably mounted in the anchors and are formed with enlarged collars which are adapted to abut the anchors and limit the circumferential movement of the shoe 304-1 in a counterclockwise direction and the circumferential movement of the shoe 304-4 in a clockwise direction.

The rotatable drum 302 includes an axially projecting flange 324 which defines a central aperture 325 for mounting the drum on a rotatable shaft, axle, or like member.

In the operation of the embodiment of the invention illustrated in FIGS. 14 and 15, it will be assumed first that the drum 302 is rotating in a clockwise direction. Upon a fluid pressure being applied to the cylinder 305 the piston rods 312 and 313 are retracted axially inwardly of the cylinder to engage the torque shoes 304-1 and 304-4 in frictional contact with the cylindrical surface 303 of the drum. The tension force thus applied by the piston rod 312 to the shoe 304-1 wraps-up along the length of the shoe and is transmitted as a larger tension force to the shoe 304-3 through the link 318. This increase in the tension forces developed within the respective members 312 and 318 results from the flexible nature of the backing 304B-1 of the shoe 304-1 which permits the torque shoe 304-1 to flex into continuous frictional contact with the cylindrical surface 303 throughout the entire length of the shoe. In this respect the action of the shoe 304-1 and the tension forces at the opposite ends thereof is analogous to the friction wrap-up of a flexible belt along a periphery of a pulley wheel. The increased tension force transmitted through the link 318 engages the torque shoe 304-3 in frictional contact with the drum whereby the actuating force wraps-up along the surface of the shoe 304-3 and is applied as an increased force through the link 319 to the shoe 304-5. The actuating force continues to wrap-up and increase along the length of the shoe 304-5 and is applied through the link 320 to the shoe 304-2 where the force continues to wrap-up and increase in magnitude. From the shoe 304-4 the force is transmitted in tension through the link 321 to move the shoe 304-4 into frictional contact with the drum by moving the shoe to a limiting position determined by abutment of the collar of the drag link 330 with the anchor 323, whereby all of the torque shoes are frictionally engaged with the rotating drum. The drag link 330 and the anchor 323 thus transmit the total torque developed within the friction couple.

It will be recognized that the circumferential movement of the torque shoes with a counterclockwise direction of rotation of the drum 302 is limited by the drag link 320 interconnecting the end of the shoe 304-1 with the fixed anchor 322.

As in the other embodiments of this invention, the manner in which the shoes are alternately linked permits an actuating force applied to a first shoe to make a complete traverse of the circumference of the drum and thereby be increased in magnitude before being transmitted to a second shoe which is immediately adjacent the first shoe. Thus, the actuating force transmitted between any two adjacent shoes is considerably increased as compared to conventional arrangements wherein immediately adjacent shoes are directly connected together, and the overall torque transmitting effectiveness of the friction couple is increased as compared to such conventional arrangements.

In accordance with this invention all the embodiments illustrated in the various figures of the drawings incorporate an actuating means connected to a selected point on a first torque shoe and force transmitting linkages which connect the first torque shoe to a predetermined point on a second adjacent torque shoe, which corresponds in location to the selected point on the first torque shoe, in a manner such that the force transmitting means include at least a portion of a third torque shoe. In this manner the force transmitted from the first torque shoe to the second torque shoe is caused to make a complete transit of the inner circumference of the drum and provide an enlarged braking force as compared to that obtainable in friction couples having adjacent torque shoes directly connected together.

In several of the illustrated embodiments, the torque shoes are linked together at their end points to utilize a wrap-up of the frictional force along the arc of the frictional surface of each torque shoe for increasing the force transmitted to the succeeding linked shoe. In such embodiments the forces accumulate along the arc of each shoe in a capstan effect, and this accumulation of the force, in combination with the transits of the forces around the inner circumference of the drum provided by the alternately linked arrangement of applicant's invention, provides a quite large braking force.

Other embodiments of the invention incorporate torque shoes that are alternately linked together at their central portions. In such embodiments the forces in the linked members are multiplied in the process of being transmitted from the first shoe actuated by the expansion means to a second shoe adjacent the first shoe. This multiplication of the force results from the successive addition of the friction forces developed by the torque shoes interposed in the linkage interconnecting the first and second torque shoes. The embodiments of the invention which incorporate torque shoes interlinked at their central portions also provide a large braking force by reason of the large angular inclination of the links or struts with the torque shoes which permits a large component of the force within the struts to act normal to the torque shoes.

In several embodimens of the invention articulated linkages are incorporated for interconnecting the alternate shoes. By providing a center-to-center linked shoe arrangement with articulated linkages wherein the points of articulation are received within a fixed stationary guide, the angular inclination at which the actuating force is transmitted to each torque shoe is reduced as compared with a center-to-center linked shoe arrangement which does not incorporate such articulated linkages. Depending upon the specific friction materials employed and the intended application for the friction couple, the reduced torque transmitting characteristics obtainable with this smaller angle may be desirable.

In all of the articulated linkages the compressive forces developed within the linkages by engagement of a torque shoe with a fixed anchor provide radially outwardly directed force components at the points of articulation as well as the tangentially directed components which act to shift the linkages longitudinally to transmit forces between the linked torque shoes. This invention comprehends arrangements for either receiving such radial forces in fixed support members or applying such forces to the torque shoes in a regenerative manner to increase the torque transmitting effect. In the latter case the regenerative force at the points of articulation not only increases the braking effort by causing greater frictional engagement of the shoe on which the regenerative force is applied but also causes an increased force to be developed in the linkage connecting such a shoe to the next succeeding shoe so that the regenerative effect of such a force on one shoe is transmitted throughout the friction couple to further increase the torque transmitted through the couple.

This invention further comprehends the utilization of flexible torque shoes and connecting links which freely bend upon a force being applied thereto to apply a continuous regenerative force to the torque shoes along the complete arc of the torque shoe rather than at a selected point on the arc as obtained with the above-mentioned articulated links. By reason of the capstan effect obtainable along the entire length of such flexible links and flexible torque shoes, the torque transmitting characteristics of a friction couple which incorporates such flexible links provides a larger braking force than those which incorporate rigid or articulated links.

Thus, in all the embodiments of the invention the braking forces in the linked members increase in the process of transmission from the first shoe, which is connected directly to the actuating means, to the shoe which is engaged with the fixed anchor by the rotation of the outer drum.

While the various embodiments of the invention have been primarily illustrated and described as incorporated in an internal expanding type of friction couple wherein compression forces are developed within the linkages interconnecting the torque shoes, the various embodiments of the invention are also applicable to an external contacting-type friction couple wherein tension forces are developed within the linkages interconnecting the torque shoes.

Although double-ended actuating cylinders have been illustrated in various figures of the drawings, it will be recognized that the primary function of such cylinders is to permit actuation of the friction couple for either direction of rotation of the drum and that the force exerted by the cylinder on the shoe engaged with the anchor is of almost negligible effect so far as the overall braking effort is concerned.

Also while the present invention has been described in several respects from the standpoint of a brake as one form of a friction couple, it will be appreciated that the construction can also be used in a clutch, especially where there is a great deal of torque to be contended with and where it is important to produce quick and highly effective torque coupling.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A friction couple comprising, a rotatable drum having a cylindrical surface, a plurality of torque shoes arrayed along the cylindrical surface of the drum in adjacent relation, the torque shoes being movable in radial and circumferential directions, non-rotatable anchor means engageable with at least one of said shoes for anchoring said torque shoes against movement in a circumferential direction, actuating means operative to apply a force for initiating engagement of the plurality of torque shoes in frictional contact with the cylindrical surface of the drum, means interconnecting the plurality of torque shoes including first force transmitting means interconnecting the actuating means and a selected point on a first torque shoe, and second force transmitting means connecting the first torque shoe to a predetermined point on a second adjacent torque shoe, said predetermined point corresponding in location to the selected point on the first torque shoe, said second force transmitting means including at least a portion of a third torque shoe.

2. A friction couple comprising, a rotatable drum having a cylindrical surface, a plurality of torque shoes arrayed along the cylindrical surface of the drum in adjacent relation, the torque shoes being movable in radial and circumferential directions, non-rotatable anchor means for engaging at least one of said plurality of torque shoes to anchor the torque shoes against movement in a circumferential direction, actuating means operative to apply a force for initiating engagement of the plurality of torque shoes in frictional contact with the cylindrical surface of the drum, means interconnecting the plurality of torque shoes and including first force transmitting means interconnecting the actuating means and a first torque shoe, and second force transmitting means interconnecting the first torque shoe and a second adjacent torque shoe, said second force transmitting means including at least a portion of a third torque shoe, whereby a force developed within said actuating means and transmitted to said first torque shoe actuates said second force transmitting means including the third torque shoe to move the second adjacent torque shoe into frictional contact with the cylindrical surface of the drum.

3. A friction couple as defined in claim 2 wherein said cylindrical surface is an inner cylindrical surface and said torque shoes are movable radially outwardly into frictional contact with the inner cylindrical surface.

4. A friction couple as defined in claim 2 wherein said cylindrical surface is an outer cylindrical surface and said torque shoes are movable radially inwardly into frictional contact with the outer cylindrical surface.

5. A friction couple as claimed in claim 2 wherein the second force transmitting means includes both an articulated linkage extending from the first shoe to the third shoe and guide means fixed independently of said plurality of torque shoes, and wherein said articulated linkage has a point of articulation slidably received within the guide means fixed independently of said plurality of torque shoes.

6. A friction couple as claimed in claim 2 wherein the second force transmitting means includes both an articulated linkage extending from the first shoe to the third shoe and guide means on said second torque shoe, and wherein said articulated linkage has a point of articulation slidably received within the guide means on said second torque shoes.

7. A friction couple as claimed in claim 2 wherein the second force transmitting means includes both an articulated linkage extending from the third torque shoe to the second torque shoe and guide means fixed independent of said plurality of torque shoes, and wherein said articulated linkage has a point of articulation slidably received within the guide means fixed independent of said plurality of torque shoes.

8. A friction couple comprising, a rotatable drum having a cylindrical surface, a plurality of torque shoes arrayed along the cylindrical surface of the drum in adjacent relation, the torque shoes being movable in a radial direction into and out of frictional engagement with the cylindrical surface and being movable in a circumferential direction by such frictional engagement, said shoes having leading and trailing portions with respect to the direction of rotation of the outer drum, non-rotatable anchor means for anchoring said plurality of torque shoes against movement in a circumferential direction, actuating means operative to apply a force for initiating engagement of the plurality of torque shoes in frictional contact with the cylindrical surface of the drum, means interconnecting the plurality of torque shoes and the actuating means including a first connection between the actuating means and a leading portion of a first shoe, and a second connection between the trailing portion of the first shoe and a leading portion of a second shoe, said second shoe being immediately adjacent said first shoe, and said second connection including a third shoe.

9. A friction couple as claimed in claim 8 wherein the second connection includes a unitary rigid linkage extending from the trailing portion of said first shoe to said third shoe.

10. A friction couple as claimed in claim 8 wherein the second connection includes an articulated linkage extending from the trailing portion of said first shoe to said third shoe.

11. A friction couple comprising, a rotatable drum having a cylindrical surface, a plurality of torque shoes arrayed along the cylindrical surface of the drum in adjacent relation, the torque shoes being movable in radial and circumferential directions, non-rotatable anchor means for anchoring said plurality of torque shoes against movement in a circumferential direction, actuating means operative to apply a force for engaging the plurality of torque shoes in frictional contact with the cylindrical surface of the drum, a first connection between the actuating means and a selected point at substantially the central portion of a first shoe, and a second connection between the selected point on the first shoe and a predetermined point at substantially the central portion of a second shoe, said second shoe being immediately adjacent the first shoe, and said second connection including a support on a third shoe.

12. A friction couple as claimed in claim 11 wherein the second connection includes a unitary rigid linkage extending from the selected point on the first shoe to the third shoe.

13. A friction couple as claimed in claim 11 wherein the second connection includes an articulated linkage extending from the selected point on the first shoe to the third shoe.

14. A friction couple comprising, a rotatable drum having a cylindrical surface, a plurality of flexible torque shoes arrayed along the cylindrical surface of the drum in adjacent relation, the torque shoes being movable in radial and circumferential directions, non-rotatable anchor means engageable with at least one of said shoes for anchoring said plurality of torque shoes against movement in a circumferential direction, actuating means operative to apply a force for engaging the plurality of torque shoes in frictional contact with the cylindrical surface of the drum, means interconnecting the torque shoes and the actuating means including first force transmitting means interconnecting the actuating means and a first torque shoe, and second force transmitting means connecting the first torque shoe to a second adjacent torque shoe, said second force transmitting means including at least a portion of a third torque shoe and a flexible member connected at opposite ends to the first and third torque shoes and disposed in closely adjacent relation to the second torque shoe, whereby frictional contact of said torque shoes with the cylindrical surface flexes the flexible member into force transmitting contact with the second torque shoe.

15. An internal expanding brake comprising, means affording a rotatable brake drum and fixed non-rotatable anchor means inwardly of the drum, an odd number including at least three segmental brake shoes arranged substantially in end-to-end relation within the brake drum, a brake pressure applying means mounted within said drum and having two pressure applying elements connected respectively to the leading and trailing ends of two of said brake shoes lying on each side of a remaining third brake shoe to apply outward braking pressure thereto, the same ends of said two brake shoes having free engagement with said anchor means so as to react against said anchor means during application of the braking force, the ends of said two brake shoes opposite the ends associated with said anchor means being linked respectively to the leading end of such a remaining third brake shoe and to the trailing end of such a remaining third brake shoe by struts that are crossed.

16. An internal expanding brake comprising, means affording a rotatable brake drum and fixed non-rotatable anchor means inwardly of the drum, an odd number including at least three segmental brake shoes arranged substantially in end-to-end relation within the brake drum, a dual cylinder and piston brake pressure applying means having the two pistons thereof connected respectively to the leading and trailing ends of two of said brake shoes lying on each side of a remaining third brake shoe to apply braking pressure thereto, the same ends of said two brake shoes having free engagement with said anchor means so as to react against said anchor means during application of the braking force, the ends of said two brake shoes opposite the ends associated with said anchor means being linked respectively to the leading end of such a remaining third brake shoe and to the trailing end of such a remaining third brake shoe by struts that are crossed.

17. An internal expanding friction couple comprising, means affording a rotatable drum and fixed non-rotatable anchor means inwardly of the drum, an odd number including at least three segmental shoes arranged substantially in end-to-end relation within the drum, a force applying means mounted within said drum and having two force applying elements connected respectively to the opposite ends of two of said shoes lying on each side of a remaining third shoe to apply outward force thereto, the same ends of said two shoes having free engagement with said anchor means so as to react against said anchor means during application of the force, the ends of said two shoes opposite the ends associated with said anchor means being linked respectively to opposite ends of such a remaining third shoe by struts that are crossed.

18. An internal expanding friction couple comprising, means affording a rotatable drum and fixed non-rotatable anchor means inwardly of the drum, an odd number including at least three segmental shoes arranged substantially in end-to-end relation within the drum, a dual cylinder and piston force applying means having each piston thereof connected respectively to an end of one of two shoes lying on each side of a remaining third shoe to apply pressure thereto, the same ends of said two shoes having free engagement with said anchor means so as to react against said anchor means during application of the force, the ends of said two shoes opposite the ends associated with said anchor means being linked respectively to opposite ends of such a remaining third shoe.

19. A friction couple comprising, a rotatable drum having a cylindrical surface, a plurality of flexible torque shoes arrayed along the cylindrical surface in adjacent end-to-end relation, said torque shoes being movable in a radial direction into and out of frictional engagement with the cylindrical surface and being movable in a circumferential direction by such frictional engagement, anchor means for anchoring said plurality of torque shoes against movement in a circumferential direction, actuating means for applying an actuating force to a first one of said plurality of shoes to institute engagement of the shoes in frictional contact with the cylindrical surface, and force transmitting means comprising a connection between said first and a second immediately adjacent torque shoe which includes at least a portion of a third torque shoe, whereby an actuating force is transmitted sequentially from the first torque shoe to the third torque shoe and to the second torque shoe.

References Cited in the file of this patent

UNITED STATES PATENTS

| | | |
|---|---|---|
| 1,620,485 | Norton | Mar. 8, 1927 |
| 1,936,870 | Delahaye | Nov. 28, 1933 |
| 1,946,032 | Parker | Feb. 6, 1934 |
| 1,948,822 | Lindblom | Feb. 27, 1934 |
| 1,975,473 | Nieman | Oct. 2, 1934 |
| 1,984,348 | Van Brunt | Dec. 11, 1934 |

FOREIGN PATENTS

| | | |
|---|---|---|
| 887,012 | France | July 26, 1943 |
| 323,542 | Great Britain | Jan. 9, 1930 |